(12) United States Patent
Power et al.

(10) Patent No.: US 12,515,110 B1
(45) Date of Patent: Jan. 6, 2026

(54) TRANSIENT LIQUID PHASE BONDING OF GOLF CLUB COMPONENTS

(71) Applicant: Topgolf Callaway Brands Corp., Carlsbad, CA (US)

(72) Inventors: Alex Power, Carlsbad, CA (US); Danielle Reyes, Carlsbad, CA (US); Scott Manwaring, Carlsbad, CA (US); William Mellor, San Diego, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 0 days.

(21) Appl. No.: 19/197,246

(22) Filed: May 2, 2025

Related U.S. Application Data

(60) Provisional application No. 63/699,609, filed on Sep. 26, 2024.

(51) Int. Cl.
*A63B 53/04* (2015.01)
*B23K 35/00* (2006.01)
*B23K 103/24* (2006.01)

(52) U.S. Cl.
CPC .......... *A63B 53/042* (2020.08); *B23K 35/007* (2013.01); *A63B 53/0466* (2013.01); *A63B 53/047* (2013.01); *A63B 2053/0491* (2013.01); *B23K 2103/24* (2018.08)

(58) Field of Classification Search
CPC ........ A63B 53/0466; A63B 2053/0491; A63B 53/047; A63B 53/042; B23K 2103/24; B23K 35/007
USPC .......................... 473/324–350, 287–292, 409
See application file for complete search history.

(56) References Cited

U.S. PATENT DOCUMENTS

| | | | | |
|---|---|---|---|---|
| 3,957,194 A | * | 5/1976 | Woodward | B23K 35/005 228/195 |
| 3,965,963 A | * | 6/1976 | Phipps | B22C 9/24 249/146 |
| 5,038,996 A | * | 8/1991 | Wilcox | B23K 35/262 228/123.1 |
| 5,118,332 A | * | 6/1992 | Hinze | C03B 37/047 65/469 |
| 5,198,062 A | | 3/1993 | Chen | |
| 5,288,070 A | | 2/1994 | Chen | |
| 5,403,007 A | | 4/1995 | Chen | |
| 5,435,551 A | | 7/1995 | Chen | |
| 5,467,983 A | | 11/1995 | Chen | |

(Continued)

OTHER PUBLICATIONS

El Refaey et al, Characterization of Titanium/Steel Joints Brazed in Vacuum, Welding Journal 113-s, May 2008.

(Continued)

*Primary Examiner* — Sebastiano Passaniti
(74) *Attorney, Agent, or Firm* — Michael A. Catania

(57) ABSTRACT

A method for transient liquid phase bonding golf club head components is disclosed herein. Golf club components composed of dissimilar materials are joined using transient liquid phase bonding. One embodiment of the transient liquid phase bonding process joins a steel component to titanium component using a pure copper interlayer heated between the temperature of 870° C. to 1085° C. The interaction between the titanium and the copper forms a eutectic below the melt temperature of pure copper, transitions to a liquid phase, and joins the titanium component to the steel component upon cooling.

8 Claims, 20 Drawing Sheets

(56) References Cited

U.S. PATENT DOCUMENTS

| | | | |
|---|---|---|---|
| 5,494,281 A | 2/1996 | Chen | |
| 5,658,208 A * | 8/1997 | Shimasaki | A63B 53/04 473/349 |
| 5,683,310 A | 11/1997 | Chen | |
| 5,807,186 A | 9/1998 | Chen | |
| 5,871,408 A | 2/1999 | Chen | |
| 6,027,010 A * | 2/2000 | Shira | A63B 60/00 228/122.1 |
| 6,089,070 A | 7/2000 | Hancock et al. | |
| 6,350,209 B1 | 2/2002 | Chen | |
| 6,368,231 B1 | 4/2002 | Chen | |
| 6,368,233 B1 | 4/2002 | Chen | |
| 6,450,896 B1 | 9/2002 | Chen | |
| 6,458,045 B1 | 10/2002 | Chen | |
| 6,494,789 B2 | 12/2002 | Chen | |
| 6,506,129 B2 | 1/2003 | Chen | |
| 6,520,868 B2 | 2/2003 | Chen | |
| 6,645,086 B1 | 11/2003 | Chen | |
| 6,720,086 B1 * | 4/2004 | Strutt | B32B 15/01 228/195 |
| 6,743,120 B1 | 6/2004 | Chen | |
| 6,749,524 B1 | 6/2004 | Chen | |
| 6,913,727 B2 | 7/2005 | Chen | |
| 6,982,053 B2 | 1/2006 | Chen | |
| 7,008,331 B2 | 3/2006 | Chen | |
| 7,056,229 B2 | 6/2006 | Chen | |
| 7,662,051 B2 | 2/2010 | Chen | |
| 7,690,098 B2 | 4/2010 | Chen | |
| 8,974,317 B1 | 3/2015 | Griffin et al. | |
| 9,687,701 B1 * | 6/2017 | Seluga | A63B 60/00 |
| 9,789,664 B2 * | 10/2017 | Cook, III | E04B 1/19 |
| 9,969,654 B2 * | 5/2018 | Fisk | B23K 20/02 |
| 10,441,857 B2 * | 10/2019 | Abe | A63B 53/047 |
| 11,318,525 B1 * | 5/2022 | Su | B21K 17/00 |
| 11,850,483 B2 * | 12/2023 | Power | A63B 53/06 |
| 2002/0148880 A1 * | 10/2002 | Brink | B23K 20/023 228/194 |
| 2003/0132415 A1 * | 7/2003 | Chigasaki | C22C 19/055 251/368 |
| 2005/0194425 A1 * | 9/2005 | Schnittgrund | B23K 35/005 228/122.1 |
| 2005/0215349 A1 * | 9/2005 | Huang | A63B 53/047 473/350 |
| 2007/0029369 A1 * | 2/2007 | Watkins | B23K 20/021 228/183 |
| 2007/0049404 A1 | 3/2007 | Chen | |
| 2007/0099721 A1 | 5/2007 | Chen | |
| 2007/0265111 A1 | 11/2007 | Chen | |
| 2007/0272726 A1 | 11/2007 | Hsu et al. | |
| 2008/0009364 A1 | 1/2008 | Chen | |
| 2008/0029496 A1 | 2/2008 | Lin et al. | |
| 2008/0039233 A1 | 2/2008 | Chen | |
| 2008/0064523 A1 | 3/2008 | Chen | |
| 2008/0102975 A1 | 5/2008 | Chen | |
| 2008/0102976 A1 | 5/2008 | Chen | |
| 2008/0102985 A1 | 5/2008 | Chen | |
| 2008/0214323 A1 | 9/2008 | Chen | |
| 2008/0293512 A1 | 11/2008 | Chen | |
| 2009/0098949 A1 | 4/2009 | Chen | |
| 2010/0056298 A1 | 3/2010 | Jertson et al. | |
| 2015/0018121 A1 | 1/2015 | Chuang et al. | |
| 2015/0045142 A1 * | 2/2015 | Moreira | A63B 53/047 473/330 |
| 2015/0064019 A1 * | 3/2015 | Lacy | B22F 7/004 416/97 A |
| 2016/0152005 A1 * | 6/2016 | Roach | F01D 11/08 156/60 |
| 2016/0175990 A1 * | 6/2016 | Sjödin | B23K 1/0012 524/414 |
| 2017/0007893 A1 | 1/2017 | Stokke et al. | |
| 2018/0209010 A1 | 7/2018 | Simone et al. | |
| 2018/0289194 A1 | 10/2018 | Kampwerth | |
| 2020/0070017 A1 | 3/2020 | Aplin et al. | |
| 2021/0060829 A1 | 3/2021 | Martens et al. | |
| 2021/0197036 A1 | 7/2021 | Billiet et al. | |
| 2023/0046415 A1 * | 2/2023 | Power | A63B 53/06 |

OTHER PUBLICATIONS

Kowalewski, Janusz & Szczurek, J., (2006) Vacuum Brazing Technics, 6, 41-45, (year 2006).

* cited by examiner

TRANSIENT LIQUID PHASE BONDING OF GOLF CLUB COMPONENTS

CROSS REFERENCES TO RELATED APPLICATIONS

The Present Application claims priority to U.S. Provisional Patent Application No. 63/699,609 filed on Sep. 26, 2024, which is hereby incorporated by refence in its entirety.

STATEMENT REGARDING FEDERALLY SPONSORED RESEARCH OR DEVELOPMENT

Not Applicable

BACKGROUND OF THE INVENTION

Field of the Invention

The present invention relates to methods of joining golf club components made of dissimilar materials, and particularly titanium and steel, to one another using transient liquid phase bonding.

Description of the Related Art

The prior art discloses various means of affixing golf club components made of dissimilar materials to one another. Titanium brazing is done in a vacuum furnace under hard vacuum or partial pressure. Steel brazing can be done in air with flux or in a vacuum furnace under hard vacuum or partial pressure. Joining titanium and steel is difficult because they cannot form a strong bond under typical processes such as welding. Brazing offers a solution to join these dissimilar materials, but the typical material used for this process is silver, which is very expensive. Therefore, there remains a need for an efficient and cost-effective method of joining titanium components to steel components.

BRIEF SUMMARY OF THE INVENTION

The present invention provides an effective method to join golf club components of dissimilar materials using transient liquid phase bonding.

One aspect of the present invention is a method for transient liquid phase bonding golf club head components. The method includes placing in a heating apparatus a first component from a first material, a second component from a second material dissimilar to the first material, and an interlayer at a joint between the first component and the second component, the interlayer comprising of at least one layer composed of at least a third material dissimilar to the first material and the second material. The method also includes applying a temperature below the melt temperature of the at least one layer. The method also includes forming a transient liquid at the joint between the two components. The method also includes diffusing the transient liquid into at least one of the first component or the second component. The method also includes solidifying at least a portion of the transient liquid to join the first component to the second component.

Another aspect of the present invention is a golf club with a first component composed of a titanium alloy and a second component composed of one of an iron alloy or a tungsten alloy. The first component and the second component are joined using transient liquid phase bonding via an interlayer disposed in a joint between the first component and the second component. The interlayer comprises a layer composed of a copper material, resulting in the formation of a transient liquid comprising copper-titanium during bonding.

Another aspect of the present invention is a golf club with a first component composed of a tungsten alloy and a second component composed of an iron alloy. The first component and the second component are joined using transient liquid phase bonding via an interlayer disposed in a joint between the first component and the second component. The interlayer comprises a first layer composed of a copper material and a second layer composed of a titanium material, resulting in the formation of a transient liquid comprising copper-titanium during bonding.

Yet another aspect of the present invention is a golf club with a first component composed of a tungsten alloy and a second component composed of an iron alloy. The first component and the second component are joined using transient liquid phase bonding via an interlayer disposed in a joint between the first component and the second component. The interlayer comprises a first layer composed of a copper material and a second layer composed of a titanium material, resulting in the formation of a transient liquid comprising copper-titanium during bonding.

Another aspect of the present invention is a golf club with a first component composed of a titanium alloy and a second component composed of one of an iron alloy or a tungsten alloy. The first component and the second component are joined using transient liquid phase bonding via an interlayer disposed in a joint between the first component and the second component. The interlayer comprises a first layer composed of a zirconium material and a second layer composed of a copper material. The first layer is in direct contact with the first component and the second layer, and the second layer is in direct contact with the first layer and the second component, resulting in the formation of a transient liquid comprising copper-zirconium during bonding.

Yet another aspect of the present invention is a golf club with a first component composed of a tungsten alloy and a second component composed of an iron alloy. The first component and the second component are joined using transient liquid phase bonding via an interlayer disposed in a joint between the first component and the second component. The interlayer comprises a first layer composed of a zirconium material and a second layer composed of a copper material, resulting in the formation of a transient liquid comprising copper-zirconium during bonding.

Yet another aspect of the present invention is a golf club with a first component composed of a tungsten alloy, a second component composed of an iron alloy, and a third component composed of a titanium alloy. The first component and the second component are joined using transient liquid phase bonding via a first interlayer disposed in a joint between the first component and the second component. The second component and the third component are joined using transient liquid phase bonding via a second interlayer disposed in a joint between the second component and the third component. The first interlayer comprises a first layer composed of a copper material and a second layer composed of one of a titanium material or a zirconium material. The second interlayer comprises a third layer composed of a copper material. The first component, the second component, and the third component are joined during the same joining operation.

Yet another aspect of the present invention is a golf club with a first component composed of a titanium alloy and a second component composed of one of an iron alloy or a tungsten alloy. A joining surface between the two components is a miter joint. The first component and the second component are joined at the miter joint using transient liquid phase bonding via an interlayer disposed in a joint between the first component and the second component. The interlayer comprises a first layer composed of a copper material and a second layer composed of a titanium material, resulting in the formation of a transient liquid comprising copper-titanium during bonding.

Yet another aspect of the present invention is a golf club with a first component composed of a first material and a second component composed of a second material. The second material is dissimilar to the first material and the first material is an iron alloy. The first component and the second component are joined using transient liquid phase bonding via an interlayer disposed in a joint between the first component and the second component. Prior to joining, the first component has undergone a process to depose a third material on at least a surface in contact with the interlayer. The third material comprises nickel.

Yet another aspect of the present invention is a golf club with a first component composed of a first material and comprising at least a first interface surface, and a second component composed of a second material and comprising at least a second interface surface. The second material is dissimilar to the first material and the first material is an iron alloy. The first component has undergone a process to depose a third material on at least the first interface surface. The third material comprises nickel. The first component and the second component are joined using transient liquid phase bonding via an interlayer disposed at least between the first interface surface and the second interface surface.

A bonding temperature is preferably between 870 C to 1085 C for copper-titanium eutectics.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

Transient Liquid Phase Diffusion Bonding/Eutectic Brazing/eutectic bonding: utilizing eutectics to form a liquid phase that creates a joint between two dissimilar base metals through the use of one or more interlayers. The process differs from brazing since the process temperature used to create the liquid phase is below the melt temperature of the interlayer or interlayers used, and new phases are formed that act as the joint.

Figure 17:
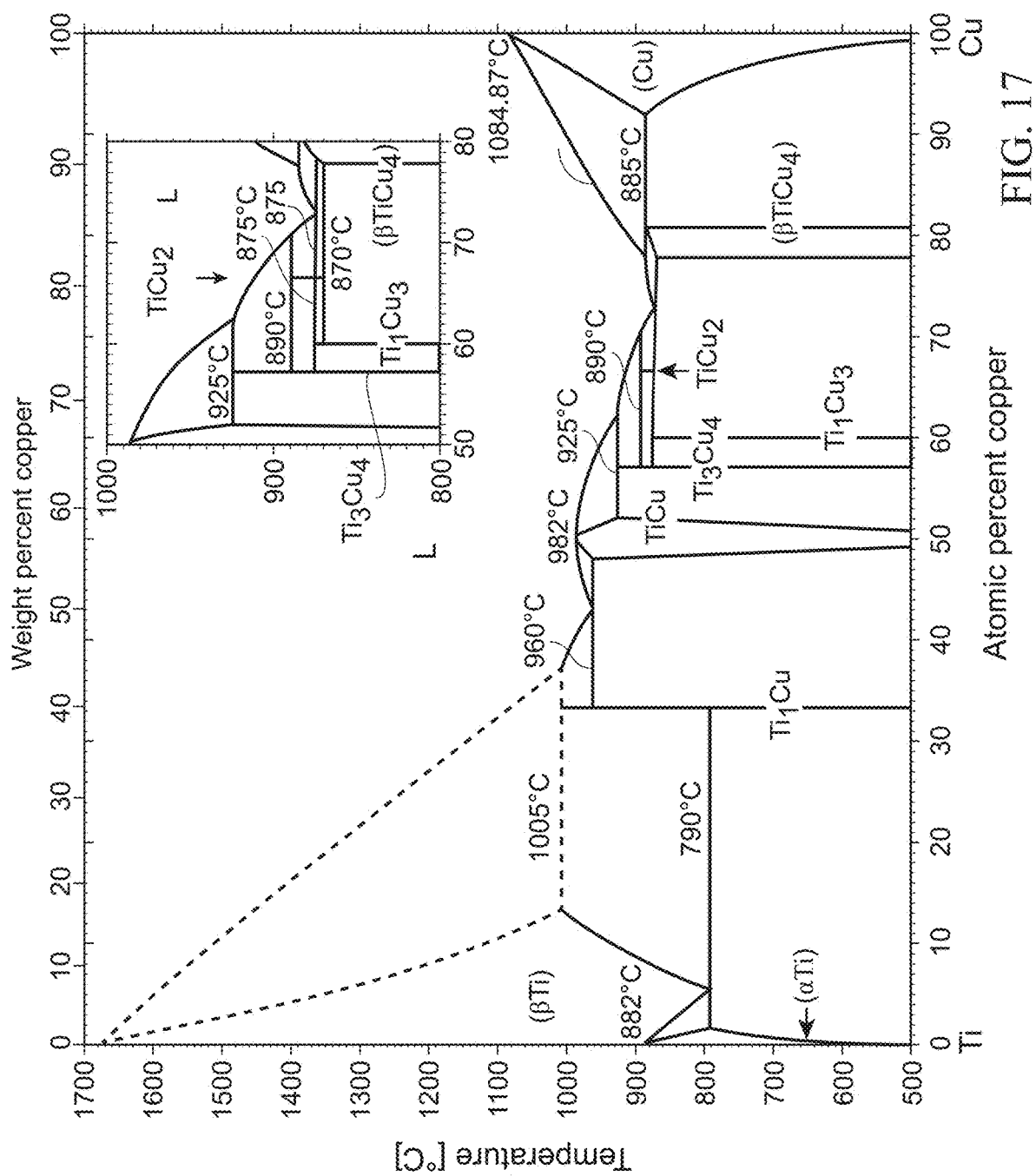
FIG. 17 is a copper-titanium phase diagram.
Figure 18:
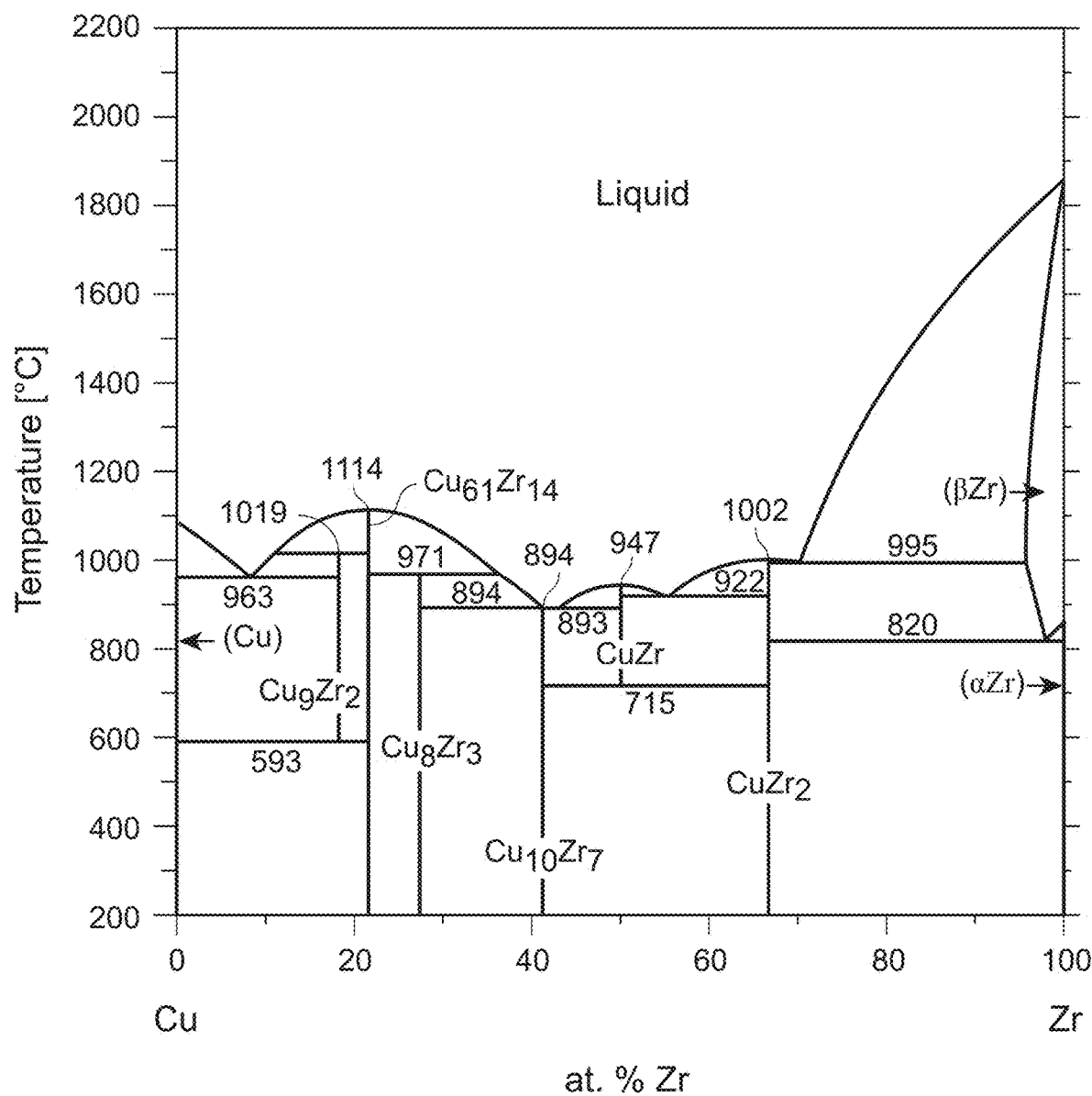
FIG. 18 is zirconium-copper phase diagram.

FIG. 17 illustrates a copper-titanium phase diagram. The transient liquid phase is between a temperature 870° C. to 1085° C. FIG. 18 is zirconium-copper phase diagram. The transient liquid phase is between the temperatures 893° C. to 1085° C.

A first embodiment of the transient liquid phase bonding process is to join a component of steel (and its alloys) or tungsten (and its alloys), to a component composed of a titanium (and its alloys) using a substantially pure copper interlayer heated between a temperature 870° C. to 1085° C. The interaction between titanium and copper forms a eutectic below the melt temperature of pure copper, transitions to a liquid phase, and joins the titanium component to the steel component upon cooling below a temperature of 870° C. The primary result is a titanium-copper intermetallic that acts as the joint (with some amounts of elements from the steel side—depending on the alloy). Depending on the temperature used and the interlayer thickness used, the composition of the intermetallic formed can be adjusted as well as the joint thickness.

A second embodiment of the transient liquid phase bonding process is to join steel (and its alloys) to tungsten (and its alloys) using a dual interlayer (pure copper and pure titanium) between 870° C. to 1085° C. (same explanation as above).

A third embodiment of the transient liquid phase bonding process is to join a component composed of a steel (and its alloys) or tungsten (and its alloys), to a component composed of a titanium (and its alloys) using a substantially pure copper interlayer and a substantially pure zirconium interlayer, heated between the temperatures 893° C. to 1085° C. The location of interlayer is important for this application so that the zirconium and copper form the main eutectic and not the titanium and copper. The stack is titanium→zirconium→copper→steel. The interaction between copper and zirconium forms a eutectic below the melt temperature of pure copper, transitions to a liquid phase, and joins the component of titanium to the component of steel upon cooling below a temperature of 893° C. The primary result is a zirconium-copper intermetallic (with some amounts of elements from the steel and titanium side—depends on the alloys) that acts as the joint. Depending on the temperature used and the interlayer thickness used, the composition of the intermetallic formed can be adjusted as well as the joint thickness.

A fourth embodiment of the transient liquid phase bonding process is to join a component of steel (and its alloys) to a component of tungsten (and its alloys) using a dual interlayer (substantially pure copper and substantially pure zirconium) between 893° C. to 1085° C. (same explanation as above).

For all these embodiments of transient liquid phase bonding, it is also possible to nickel plate the steel side. At certain temperatures, the diffusion of iron into the joint is controlled for the bonding process.

Further embodiments include a co-transient liquid phase diffusion bonding process. These co-transient liquid phase diffusion bonding embodiments include using a combination of eutectics to join the titanium face to the body at the same time as a tungsten weight to the body using a single or dual interlayer.

Combinations of dissimilar metal materials include, for example, stainless steel to titanium, steel to titanium, stainless steel to aluminum, steel to aluminum, aluminum to titanium, tungsten to titanium, tungsten to stainless steel, and tungsten to steel. In these combinations, the stainless steel may be 17-4, 304, 304L, 321, 303, 316, 316L, 420, 425, 425M, 450, 455, 475, or HSR300; the aluminum may be 6061, 6063, or 7075; the titanium may be 6-4, 811, FS2S, FS2S+, SP700, Ti 17, Ti 21, 15-3-3-3; the steel may be C300 maraging steel, 1020, 1025, 1045, 4130, 4140, 4340; and the tungsten may have a density of 10 g/cc to 18 g/cc.

An exemplary golf club head 40 made up of components 51, 53 made of dissimilar materials and assembled using the method described above is illustrated in FIG. 1. In this embodiment, the body component 53 is composed of a steel material and the face component 51 is composed of a titanium alloy material, preferably 6-4 titanium. Steel, when described herein, may include all steel variants, including stainless steel. Titanium, when described herein, may refer to pure titanium and titanium alloy may refer to all titanium alloys known to a person of ordinary skill in the art.

In another embodiment of the present invention, a golf club is assembled using the preferred method 100 described above. In this embodiment, the component 51 is a tungsten or tungsten alloy weight piece that is affixed as described above to the body 53 of a golf club head 40.

Figure 1:
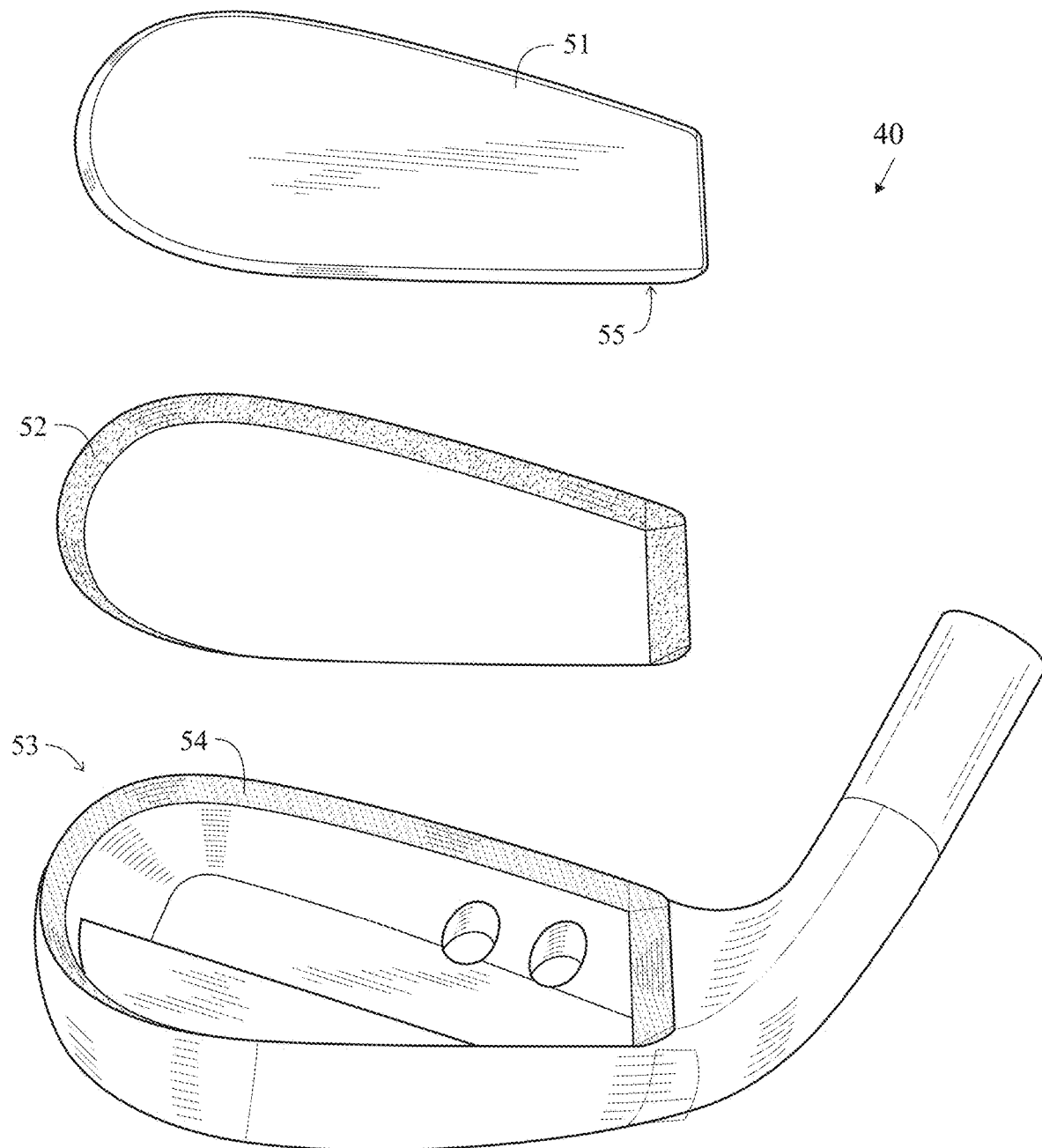
FIG. 1 is an exploded image of a first embodiment of a golf club head with components joined by transient liquid phase bonding.
Figure 2:
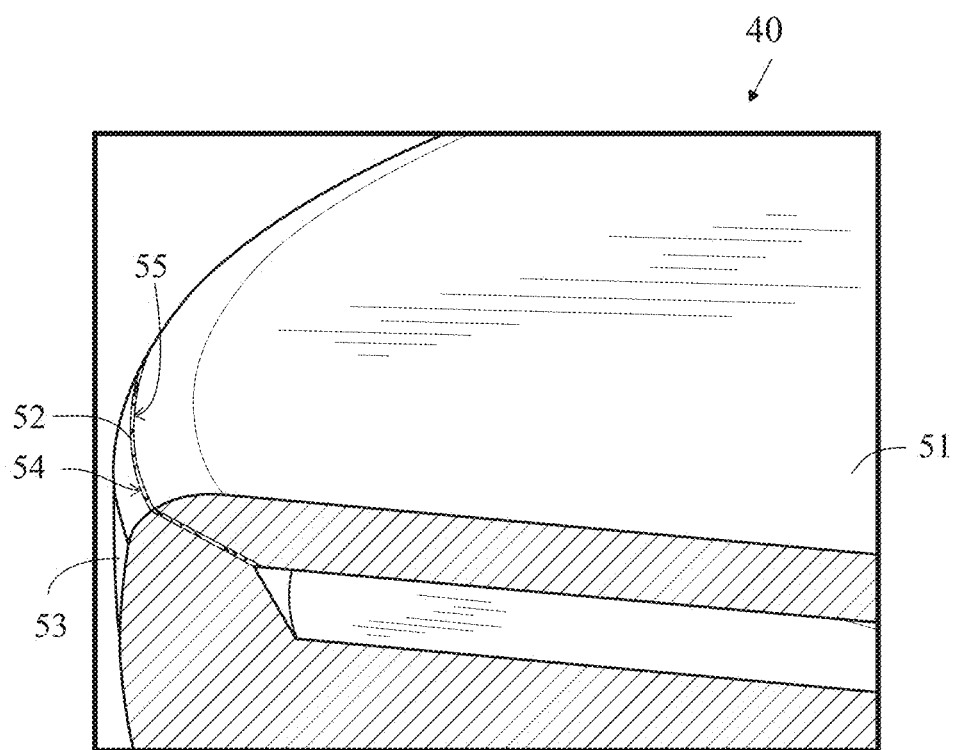
FIG. 2 is a cross-sectional view of an iron-type golf club head with parts joined by transient liquid phase bonding.
Figure 3:
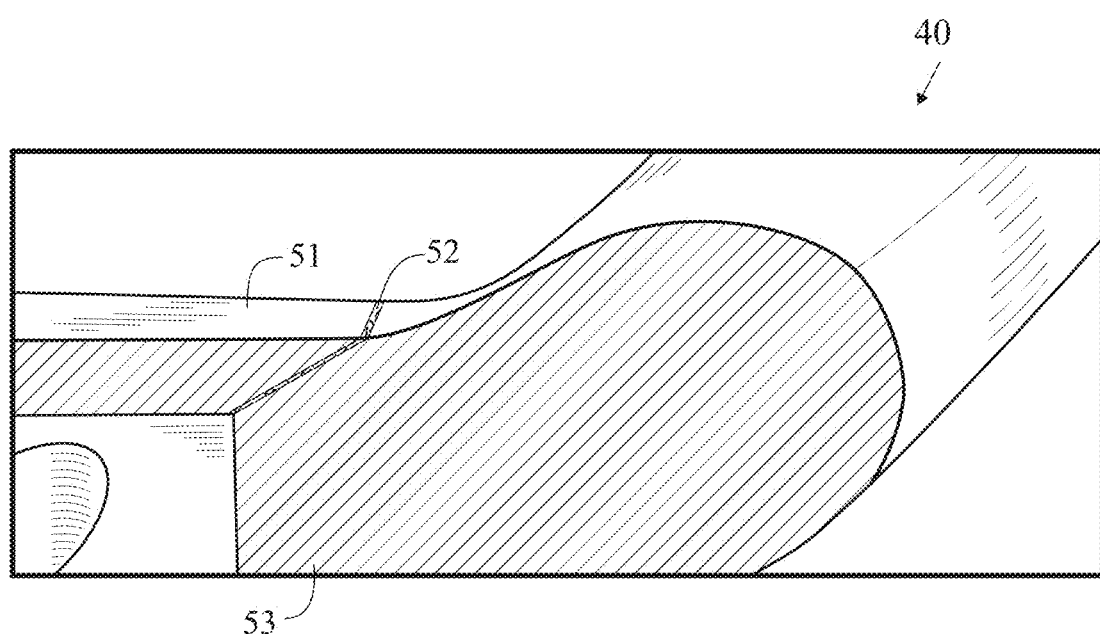
FIG. 3 is a cross-sectional view of an iron-type golf club head with parts joined by transient liquid phase bonding.
Figure 4:
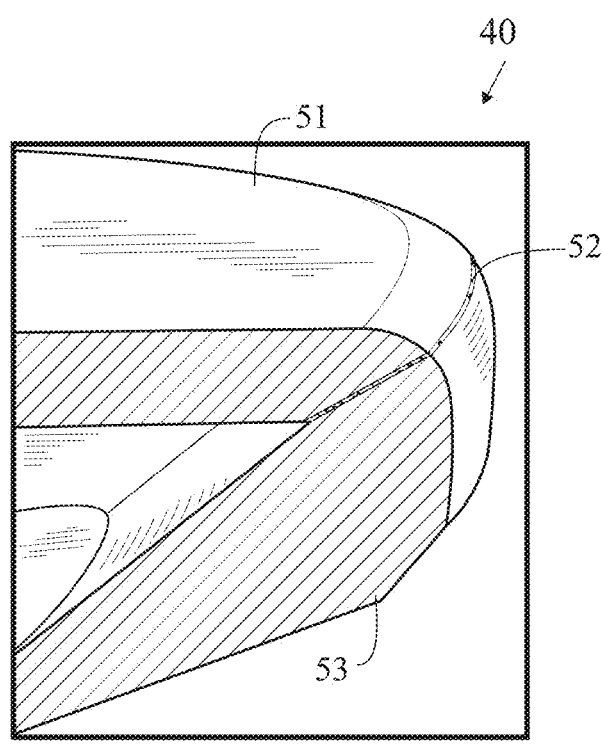
FIG. 4 is a cross-sectional view of an iron-type golf club head with parts joined by transient liquid phase bonding.

As shown in FIG. 1, an iron-type golf club head 40 has a first component 51, an interlayer 52 and a second component 53. In this embodiment, the first component 51 is a face insert and the second component 53 is a body of the iron-type golf club head. The second component 53 has an attachment surface 54 and the first component 51 has an attachment surface 55, which in this embodiment is an internal surface of the face insert. The attachment surface is the mitered joint discussed above, preferably having an angle of between ten degrees and forty degrees, more preferably between twenty-five degrees and thirty-five degrees, and more preferably 30 degrees relative to an edge of the opening for a golf club head body. The interlayer 52 is applied to the attachment surface 54. The first component 51 is fixtured within a heating apparatus, with the attachment surface 55 of the first golf club component 51 facing the attachment surface 54 of the second golf club component 53. A transient liquid phase bonding cycle within the heating apparatus is performed to bond the first component to the second component to form an iron type golf club head as shown in FIGS. 2-4.

Figure 5:
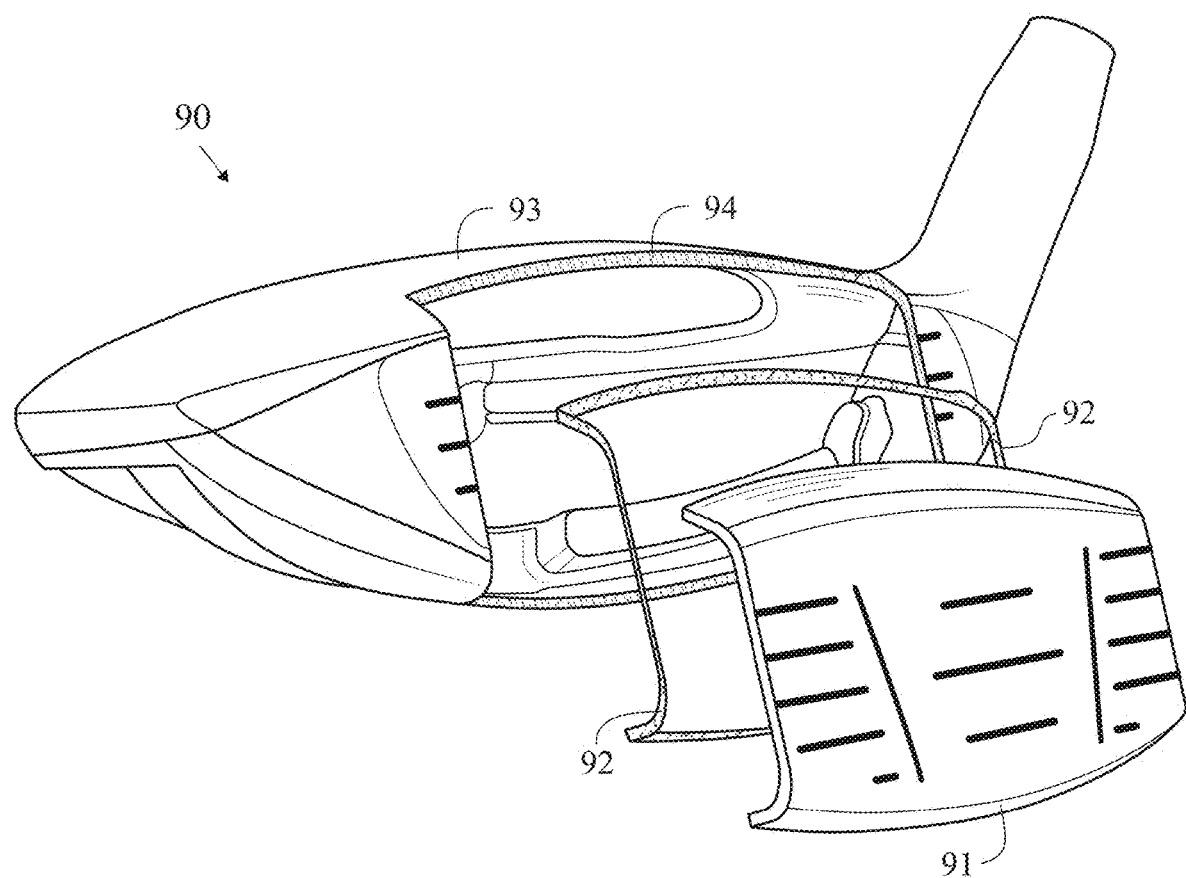
FIG. 5 is an exploded view of a wood-type golf club head having components joined by transient liquid phase bonding.

As shown in FIG. 5, a wood golf club head 90 has a first component 91, an interlayer 92 and a second component 93. In this embodiment, the first component 91 is a face insert and the second component 93 is a body of the wood-type golf club head 90. The second component 93 has an attachment surface 94 (a perimeter around an opening in the body) and the first component 91 has an attachment surface (not shown), which in this embodiment is an internal surface of the face insert. The interlayer 92 is positioned to one of the attachment surfaces 94. The first component 91 is fixtured within a heating apparatus, with the attachment surface of the first golf club component 91 facing the attachment surface 94 of the second golf club component 93. A transient liquid phase bonding cycle within the heating apparatus is performed to join the first component to the second component to form an wood-type golf club head.

Ambient pressure is approximately 760 Torr. A low vacuum has a pressure ranging 760-25 Torr. A medium vacuum has a pressure ranging from 25 to $10^{-3}$ Torr. A high vacuum has a pressure ranging from $10^{-3}$ to $10^{-9}$ Torr. In one embodiment, during a transient liquid phase bonding cycle within a heating apparatus, a reducing environment is created by generating a high vacuum preferably ranging from $10^{-3}$ Torr to $10^{-5}$ Torr. The reducing environment is created to reduce any oxides created by heating the interlayer material applied to the golf club components.

In one embodiment, the first component is a wood-type golf club face component and the second component is a wood-type golf club body component. The wood-type golf club head has a volume ranging from 200 cubic centimeters to 475 cubic centimeters.

In another embodiment, the first component is an iron-type golf club face component and the second component is an iron-type golf club body component.

In another embodiment, the first component is a face component composed of a titanium alloy, and the second component is a body component composed of a steel material.

Figure 7:
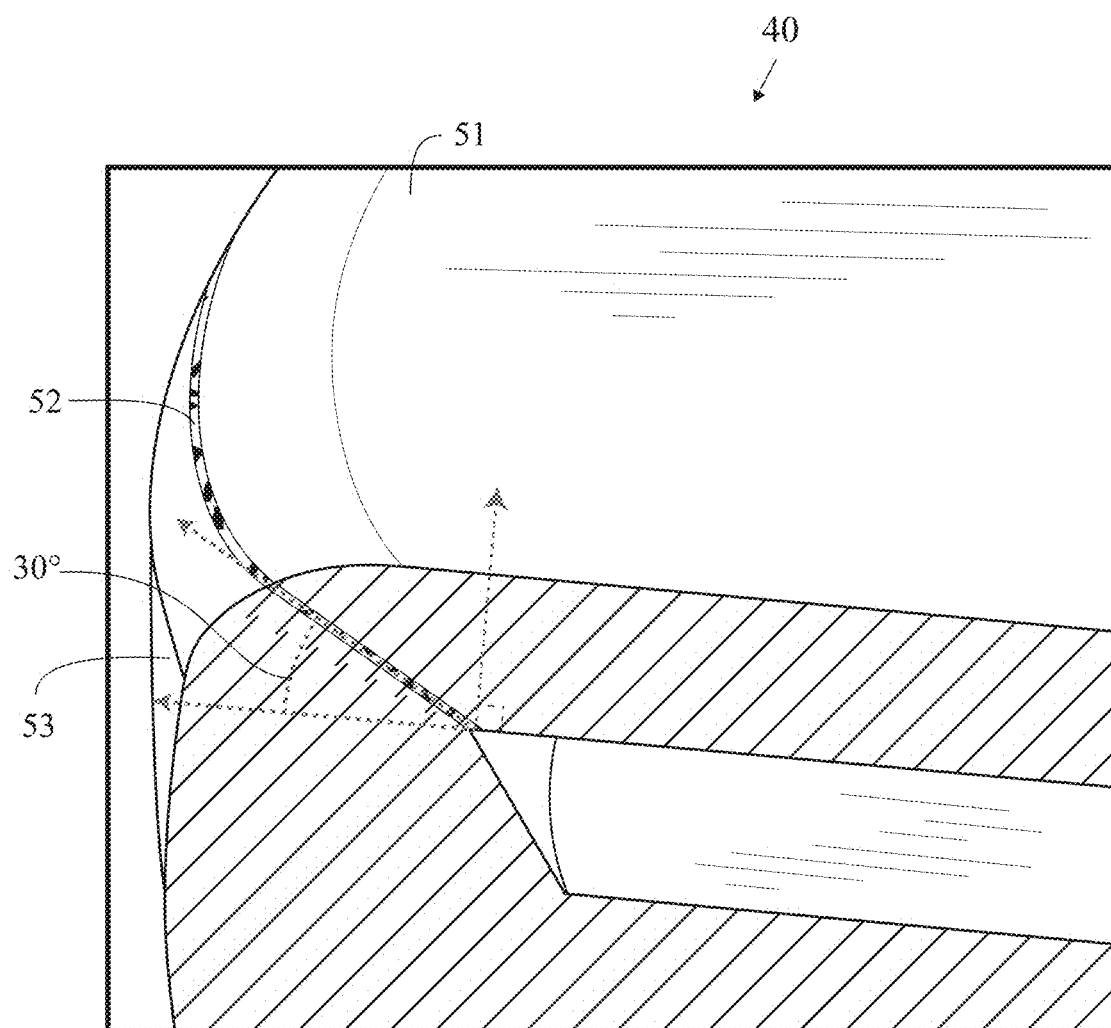
FIG. 7 illustrates a cross-sectional view of an iron-type golf club head with parts joined by transient liquid phase bonding.

FIG. 7 illustrates a cross-sectional view of an iron-type golf club head with parts joined by brazing. The golf club head 40 has a face insert 51 preferably composed of a titanium alloy material and a body 53 preferably composed of an iron-alloy material. A interlayer 52 is used to transient liquid phase bond the two different material components 51 and 53 together. The face insert 51 and body 53 are joined at a miter joint, which has an angle relative to an internal surface of the face insert 51 of preferably 10 degrees to 80 degrees, more preferably 25 degrees to 65 degrees, and most preferably 30 degrees to 60 degrees.

Figure 8:
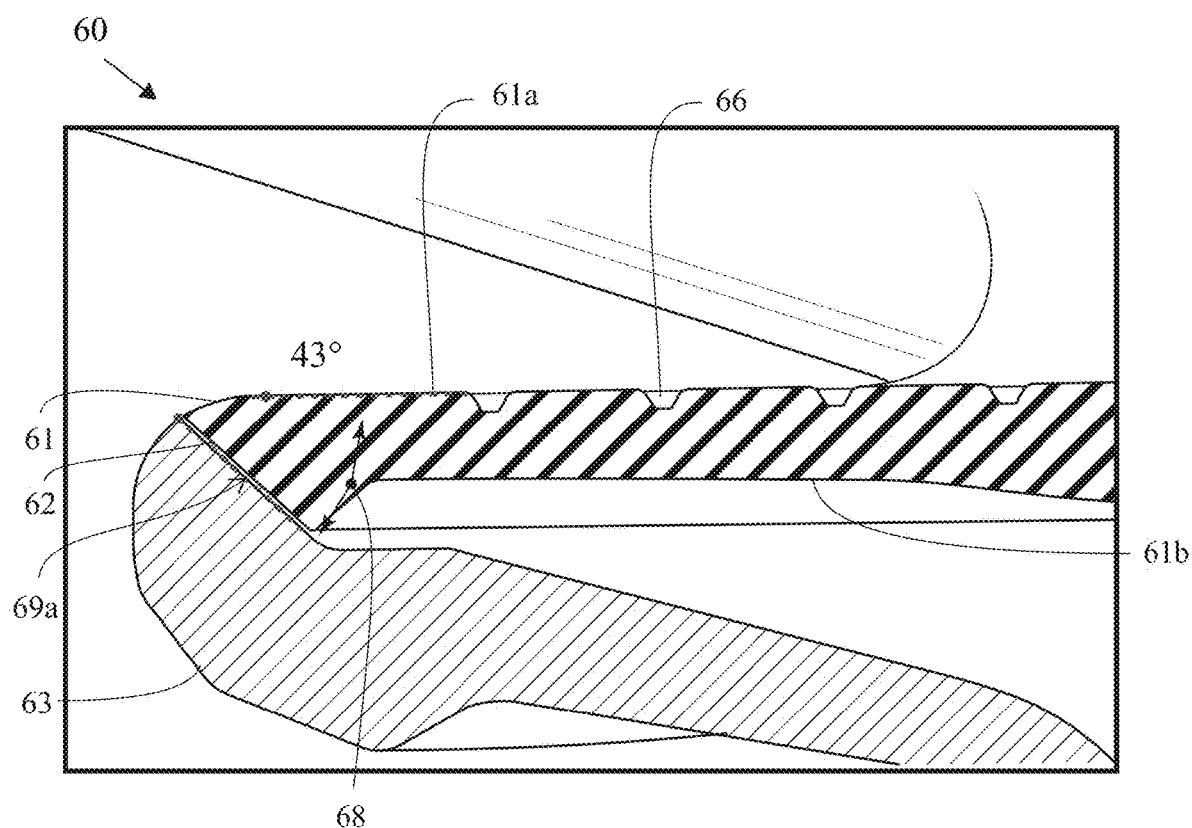
FIG. 8 illustrates an isolated cross-sectional view of a long iron-type golf club head (1-iron to 7-iron) showing a 43 degree angle miter joint.
Figure 9:
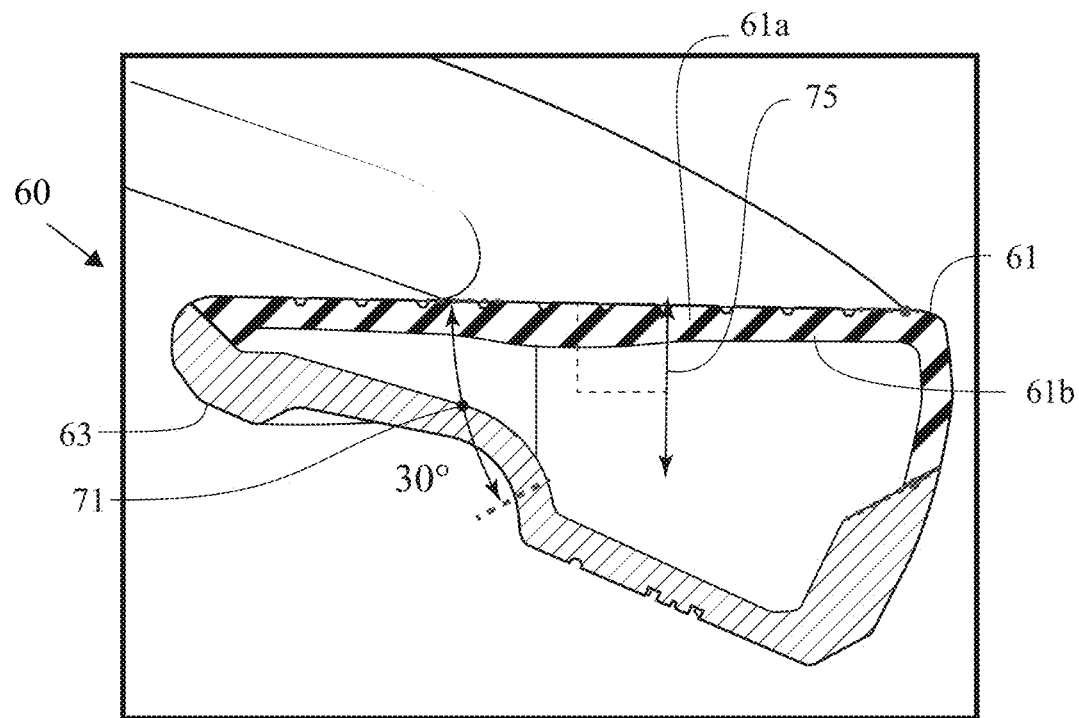
FIG. 9 illustrates an isolated cross-sectional view of a long iron-type golf club head (1-iron to 7-iron) with a return flange showing a 30 degree from an impact surface tangency and miter joint.
Figure 10:
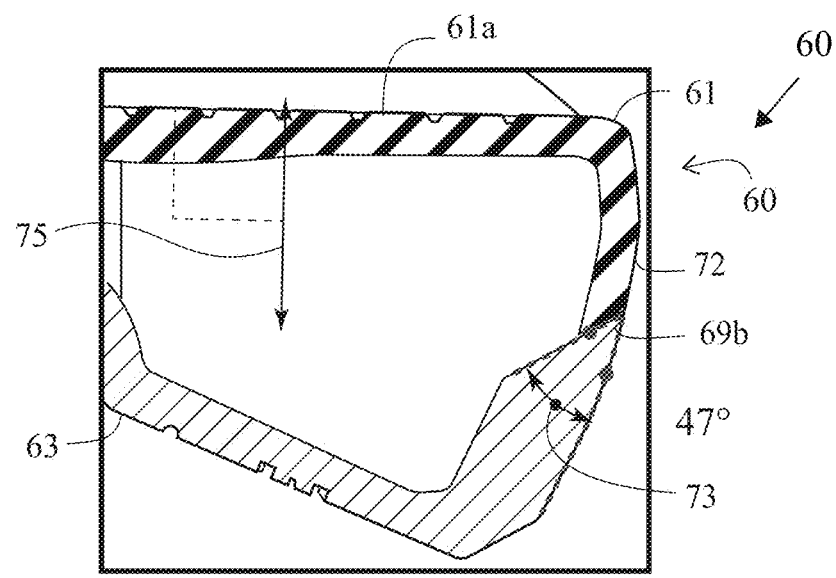
FIG. 10 illustrates an isolated cross-sectional view of a long iron-type golf club head (1-iron to 7-iron) with a return flange showing a 47 degree from an external surface tangent and miter joint.

FIGS. 8-10 illustrate a cross-sectional view of a long iron-type golf club head (1-iron to 7-iron) 60. The golf club head 60 has a face insert 61 composed of a titanium alloy and a body 63 composed of an iron alloy material. The face insert has an external surface 61*a* and an internal surface 61*b*. The external surface 61*a* preferably has grooves 66. An interlayer 62 is used to transient liquid phase bond the face insert 61 to the body 63 at a miter joint 69*a*. FIG. 8 shows an angle 68 between an external surface 61*a* of the face insert and the miter joint 69*a*. The measurement is taken at a face center. The angle 68 preferably ranges from 10 degrees to 75 degrees, more preferably from 25 degrees to 65 degrees, even more preferably from 30 degrees to 60 degrees, and is most preferably 43 degrees.

In FIG. 9, the long iron-type golf club head 60 with a return flange showing a 30 degree angle 71 from an impact surface tangency and the miter joint 69*a*. Line 75 represents a line normal to the external surface 61*a* of the face insert 61.

In FIG. 10, the long iron-type golf club head 60 has a face insert 61 with a return portion 72. The return portion 72 of the face insert 61 is joined to the body 63 at a miter joint 69*b*. The angle 73 preferably ranges from 10 degrees to 80 degrees, more preferably from 25 degrees to 65 degrees, even more preferably from 30 degrees to 60 degrees, and is most preferably 47 degrees. The angle 73 is from an external surface tangent and the miter joint 69*b*.

Figure 11A:
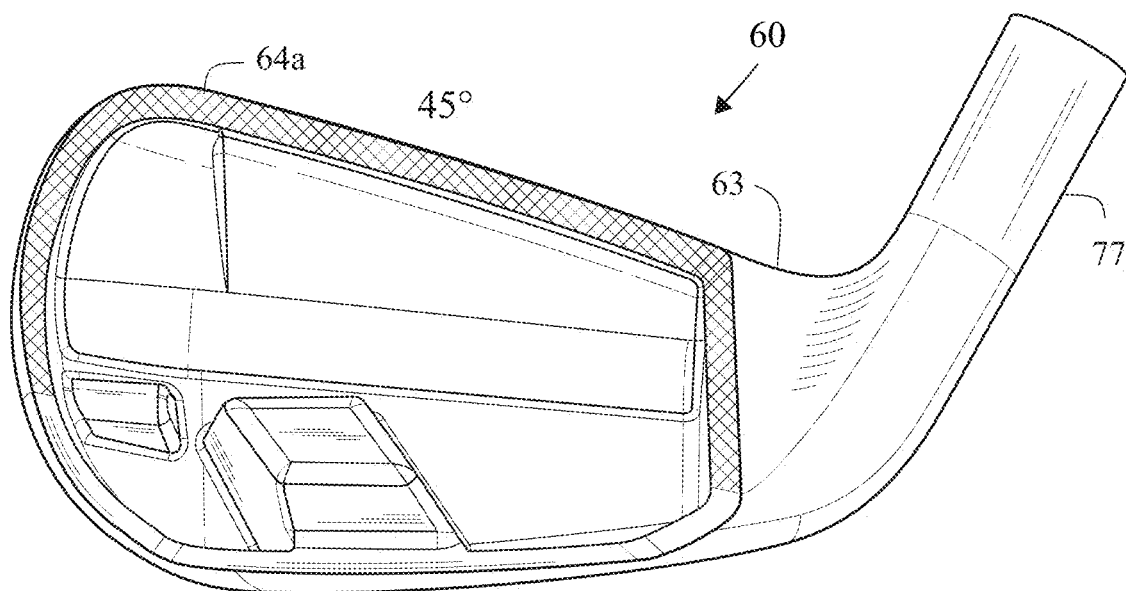
FIG. 11A is a cut-away view of a long iron-type golf club head (1-iron to 7-iron) showing a first section of an attachment surface of a body for a miter joint having a 45 degree angle.
Figure 11B:
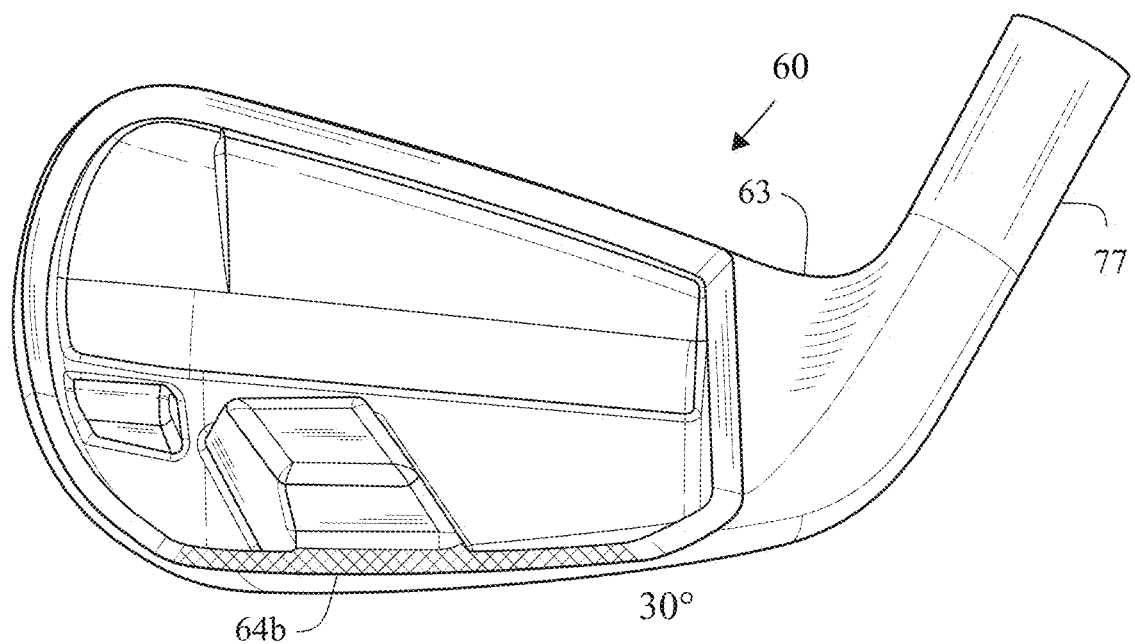
FIG. 11B is a cut-away view of a long iron-type golf club head (1-iron to 7-iron) showing a second section of an attachment surface of a body for a miter joint having a 30 degree angle.
Figure 11C:
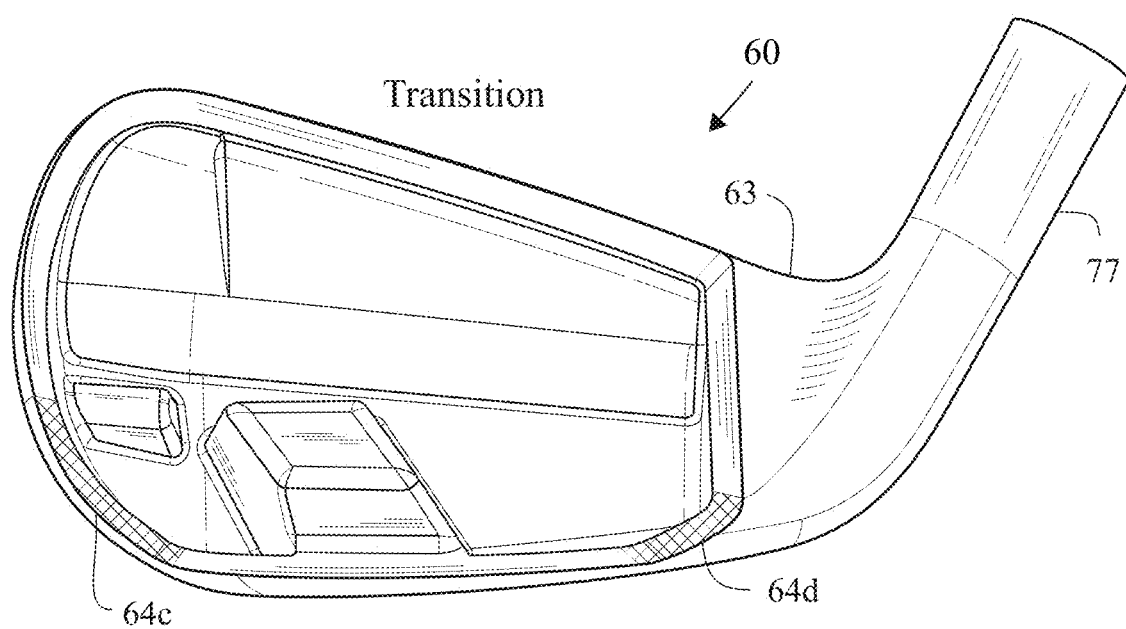
FIG. 11C is a cut-away view of a long iron-type golf club head (1-iron to 7-iron) showing transition sections of an attachment surface of a body for a miter joint.

FIGS. 11A-11C illustrate an alternative embodiment of a cut-away view of a body 63 of a long iron-type golf club head 60 showing multiple sections of the attachment surface with different miter joint angles. In FIG. 11A, a first section 64*a* of an attachment surface of the body 63 has an angle of 45 degrees. In FIG. 11B, a second section 64*b* of the attachment surface of the body 63 has an angle of 30 degrees. In FIG. 11C, transition sections 64*c* and 64*d* of the attachment surface of the body 63 have angles that transition between the angles of the first attachment surface 64*a* and the second attachment surface 64*b*. Each attachment surface 64*a*, 64*b*, 64*c* and 64*d* may have an angle relative to an internal surface of the face insert 51 of preferably 10 degrees to 80 degrees, more preferably 25 degrees to 65 degrees, and most preferably 30 degrees to 60 degrees. Further, the number of attachment surfaces with different angles preferably may vary from 20 to 2, 10 to 4 and most preferably 4.

Figure 12:
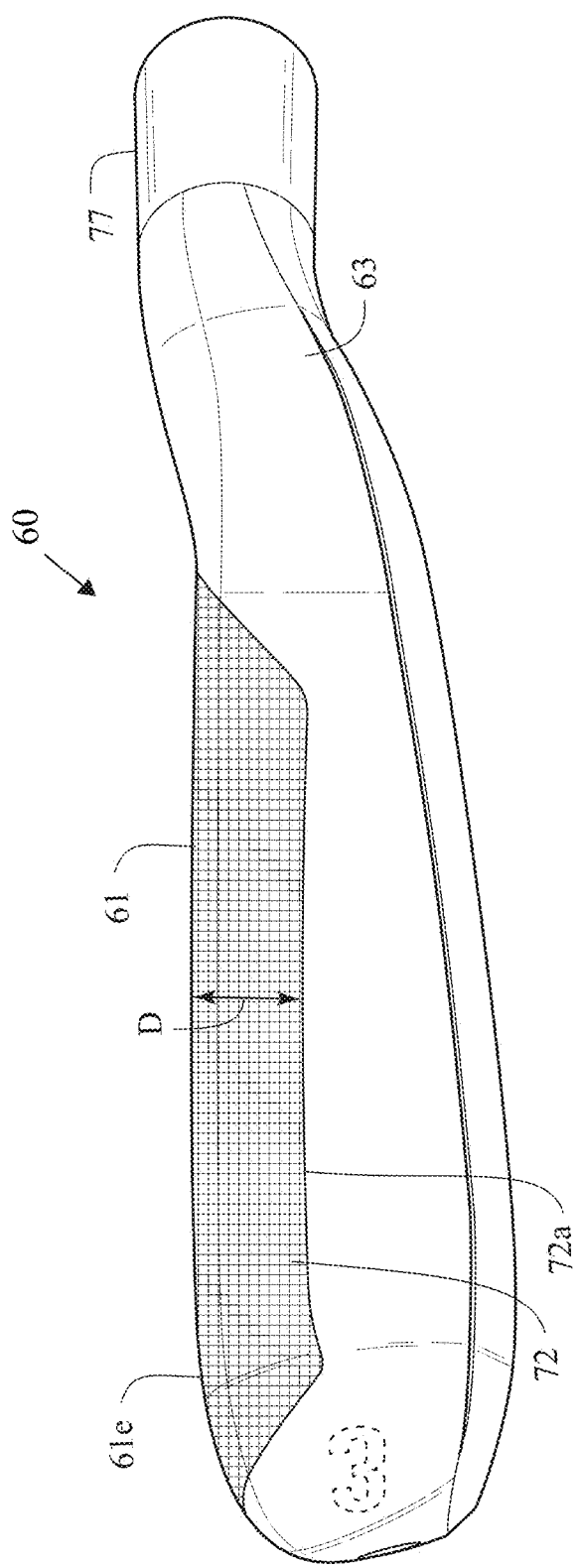
FIG. 12 is a bottom plan view of a long iron-type golf club head (1-iron to 7-iron) showing a return portion of a face insert.
Figure 13:
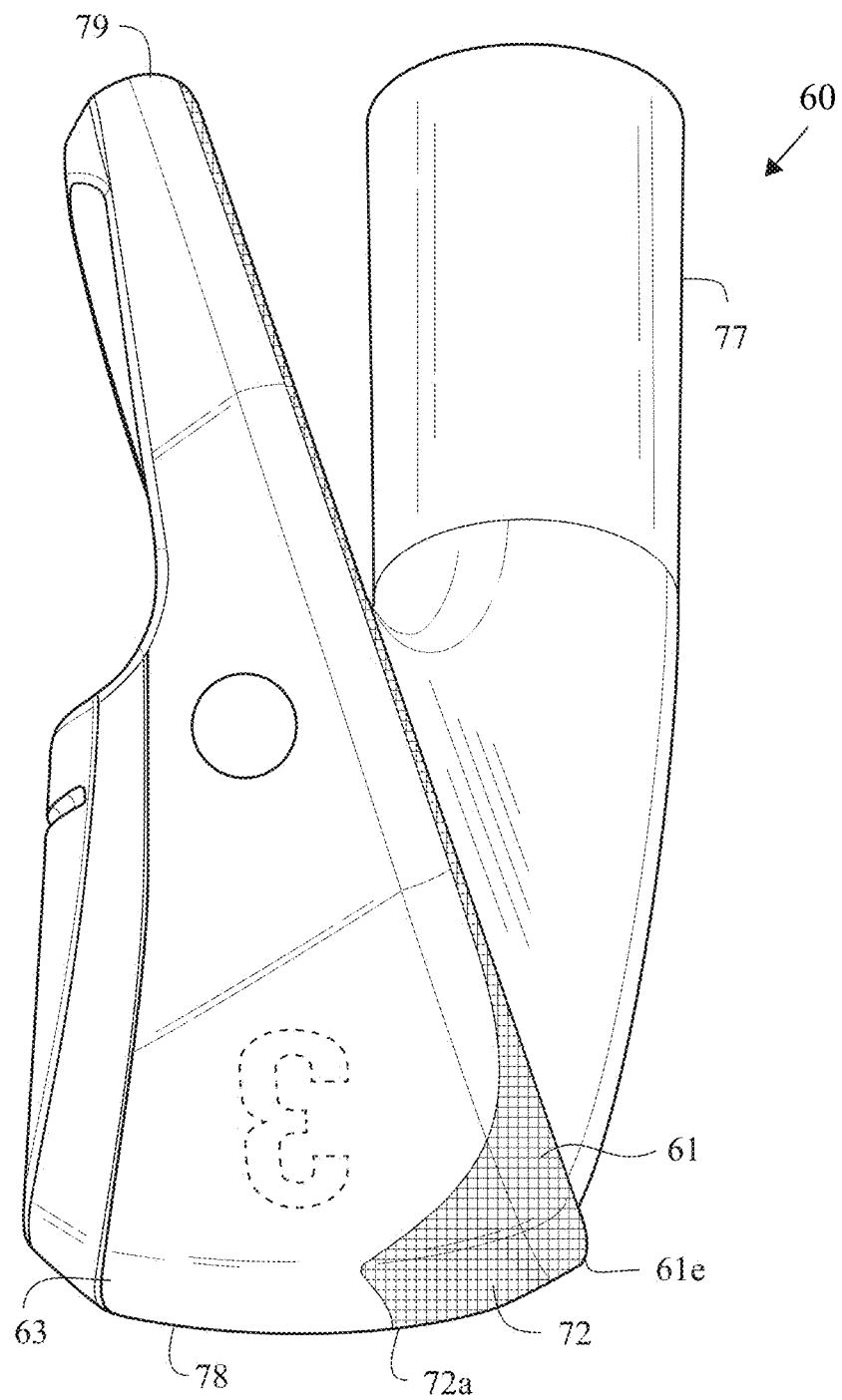
FIG. 13 is a toe-side elevation view of a long iron-type golf club head (1-iron to 7-iron) showing a return portion of a face insert.

FIGS. 12 and 13 illustrate a return portion 72 of the face insert 61 of a long iron-type golf club head (3-iron to 7-iron) 60. The return portion extends from a front edge 61*e* to a back edge 72*a*. The return portion 72 preferably has a distance D that ranges from preferably less than half of a length of a sole section 78 of the golf club head 60 to less than one quarter of the length of the sole section 78. Depending on the length of the sole section 78, the return portion has a length ranging from 0.1 to 0.7 inch, more preferably from 0.25 to 0.5 inch. In one embodiment, the return portion 72 has a distance that approximately matches a length of a crown section 79 of the golf club head 60.

Figure 14:
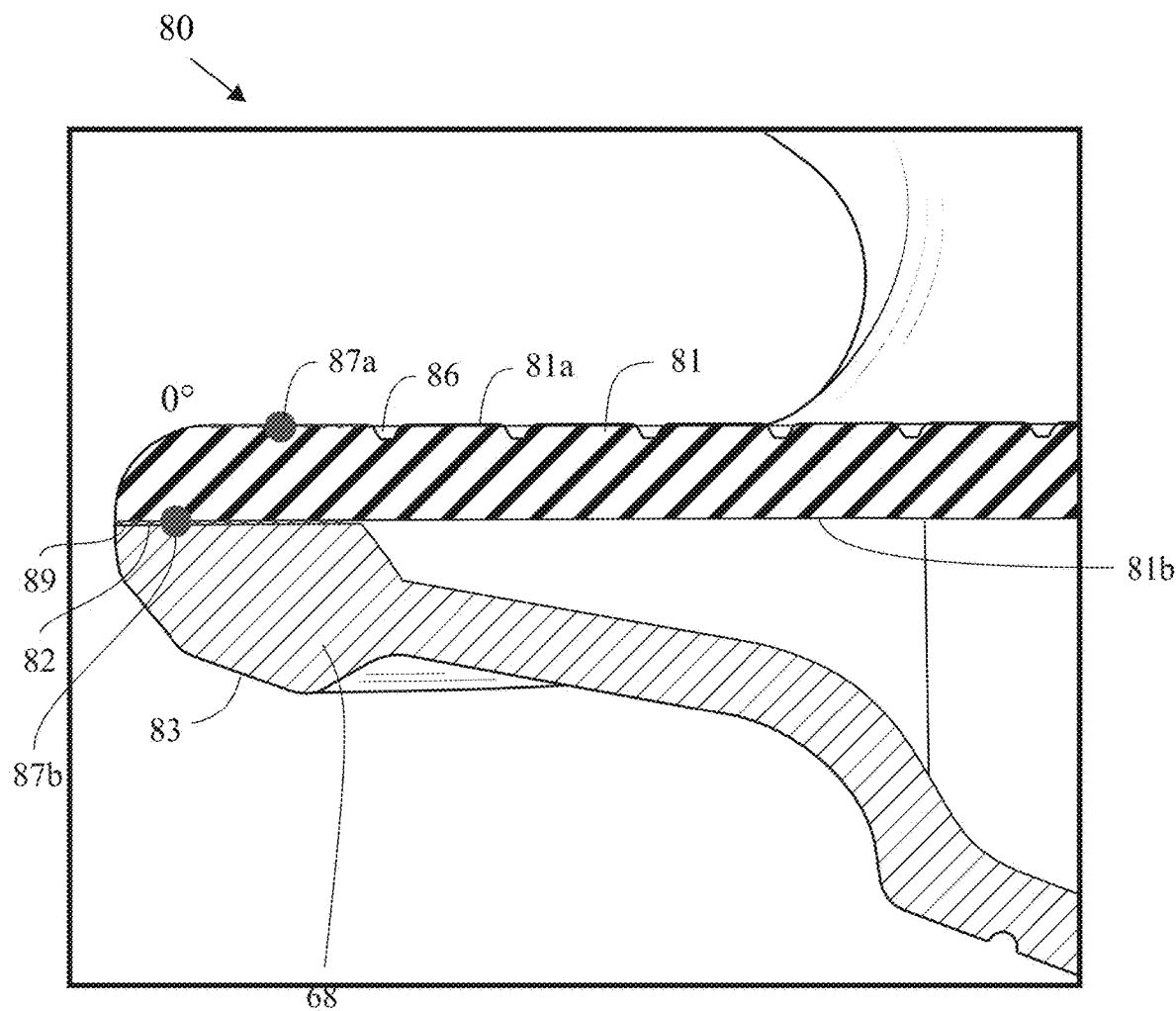
FIG. 14 illustrates an isolated cross-sectional view of a short iron-type golf club head (8-iron to sand wedge) showing a parallel joint.

FIG. 14 illustrates an isolated cross-sectional view of a short iron-type golf club head (8-iron to sand wedge) 80 showing a parallel joint. The iron-type golf club head has a face insert 81 and a body 83. The face insert 81 is transient liquid phase bonded to the body at a joint 89 using an interlayer 82. The face insert 81 has an external surface 81*a* with grooves 86 and an internal surface 81*b*. Point 87*a* is parallel to point 87*b*. The joint 89 has an angle of zero or approximately zero. Alternatively, the joint 89 has an angle ranging from 1 to 10 degrees relative to a plane of a rear surface of the face insert 81.

Figure 15:
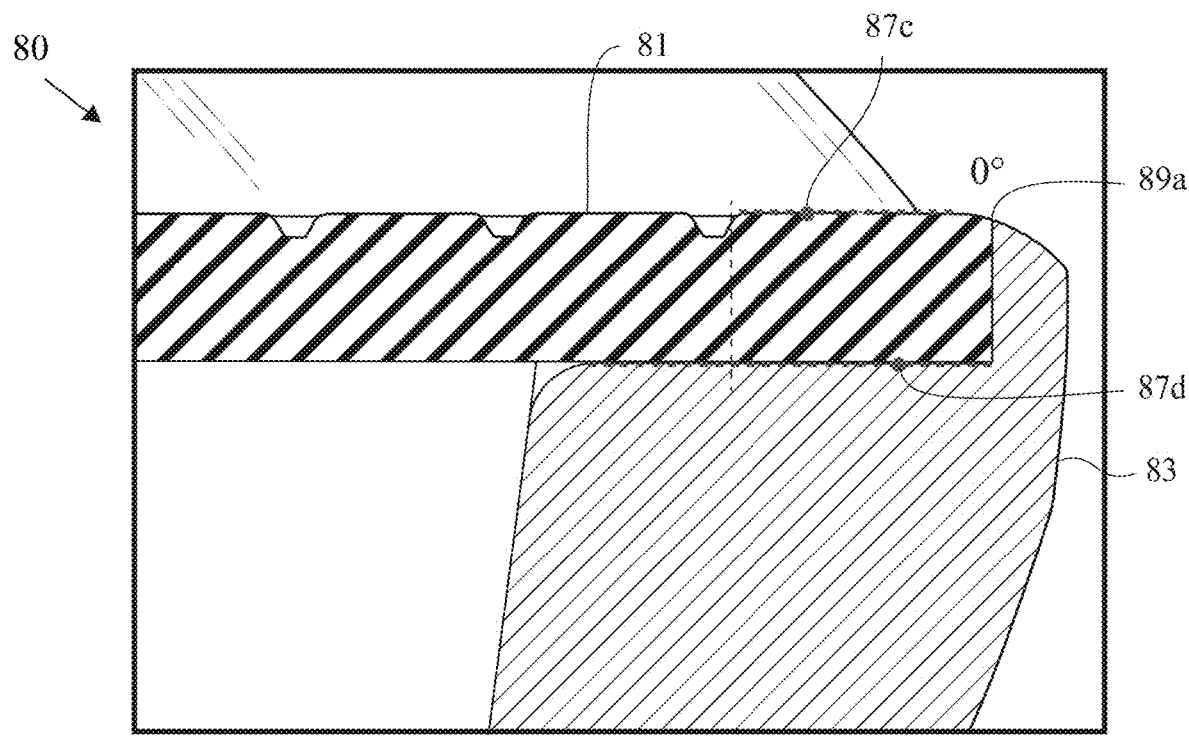
FIG. 15 illustrates an isolated cross-sectional view of a short iron-type golf club head (8-iron to sand wedge) showing a butt joint.
Figure 16:
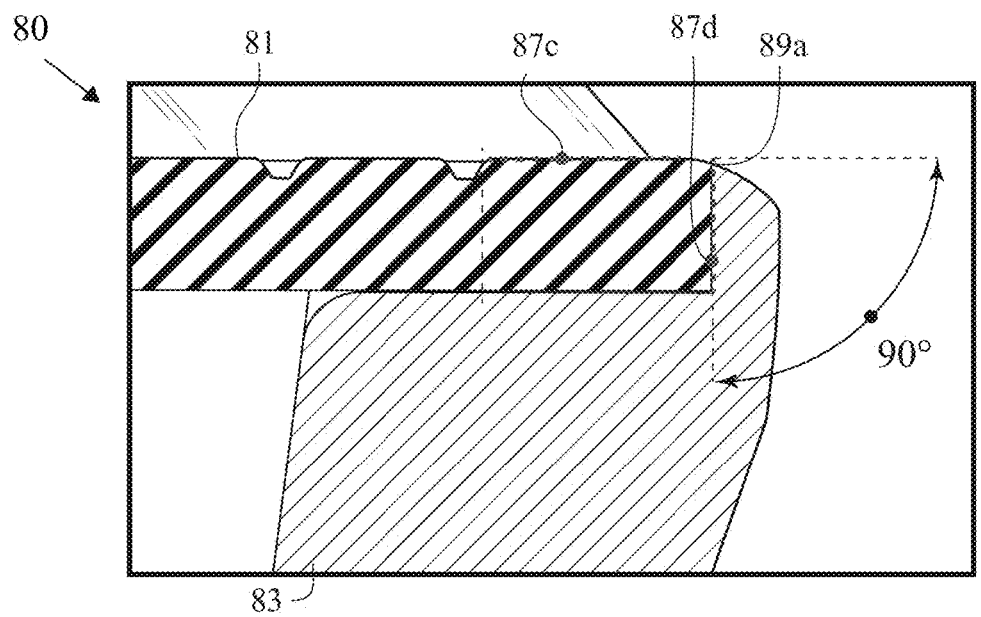
FIG. 16 illustrates an isolated cross-sectional view of a short iron-type golf club head (8-iron to sand wedge) showing a butt joint.

FIGS. 15 and 16 illustrate a short iron-type golf club head 80 with a butt joint 89*a*. Point 82 *c* is at an angle of ninety degrees to point 82*d*.

Typical loft angles for irons are set forth in Table One.

TABLE ONE

| | |
|---|---|
| #1 | 15° |
| #2 | 18° |
| #3 | 21° |
| #4 | 24° |
| #5 | 27° |
| #6 | 30° |
| #7 | 34° |
| #8 | 38° |
| #9 | 42° |
| PW | 46° |
| AW | 50° |
| SW | 55° |
| LW | 60° |

Figure 6:
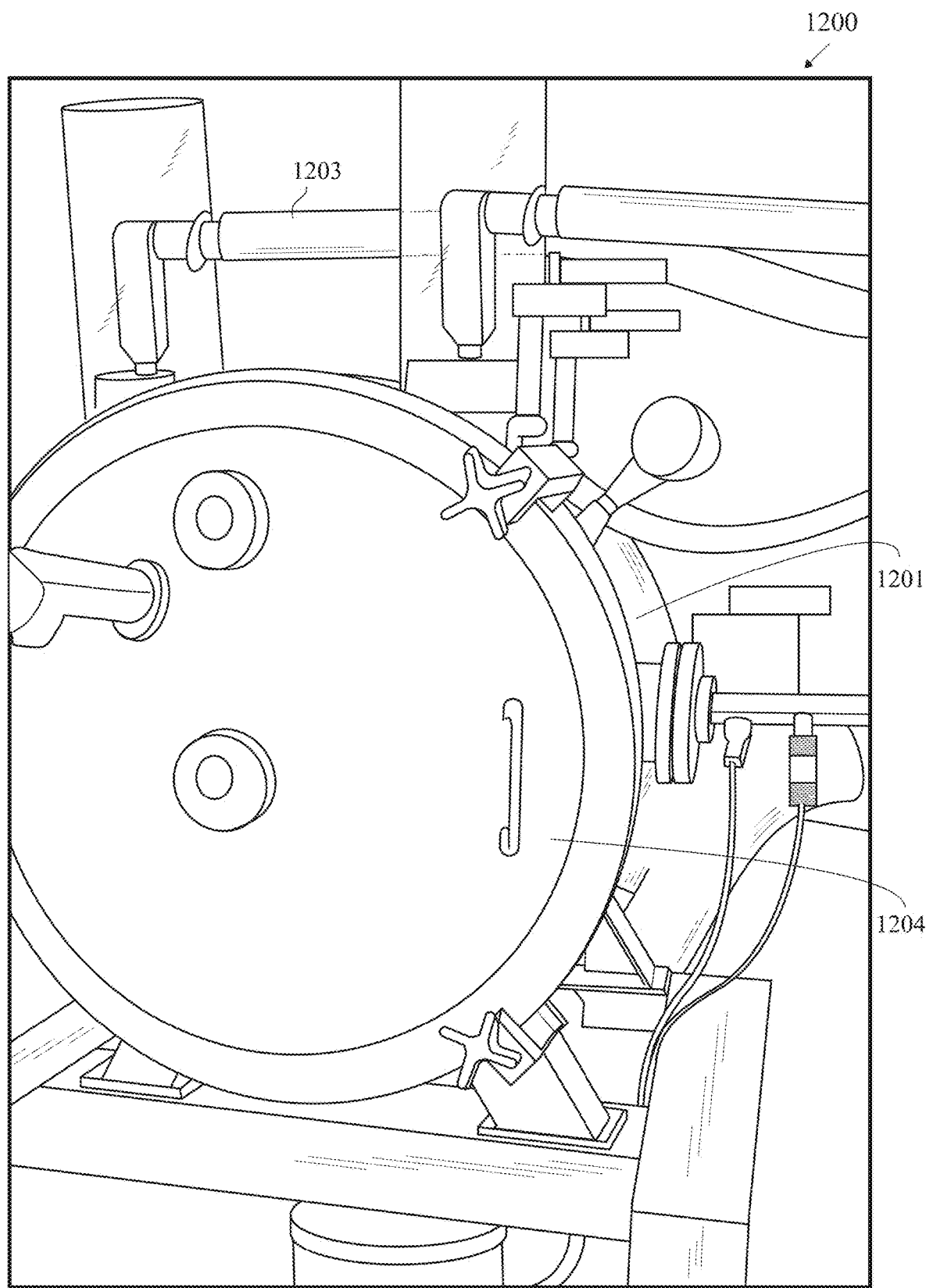
FIG. 6 is an illustration of a heating apparatus for transient liquid phase bonding.

FIG. 6 is an illustration of a heating apparatus 1200 having a chamber 1201 for placement of the fixtured golf club head components therein for the transient liquid bonding process. The chamber 1201 is accessed through a door 1204 and a vacuum line 1203 leads to a vacuum pump for evacuating the chamber 1201.

Figure 19:
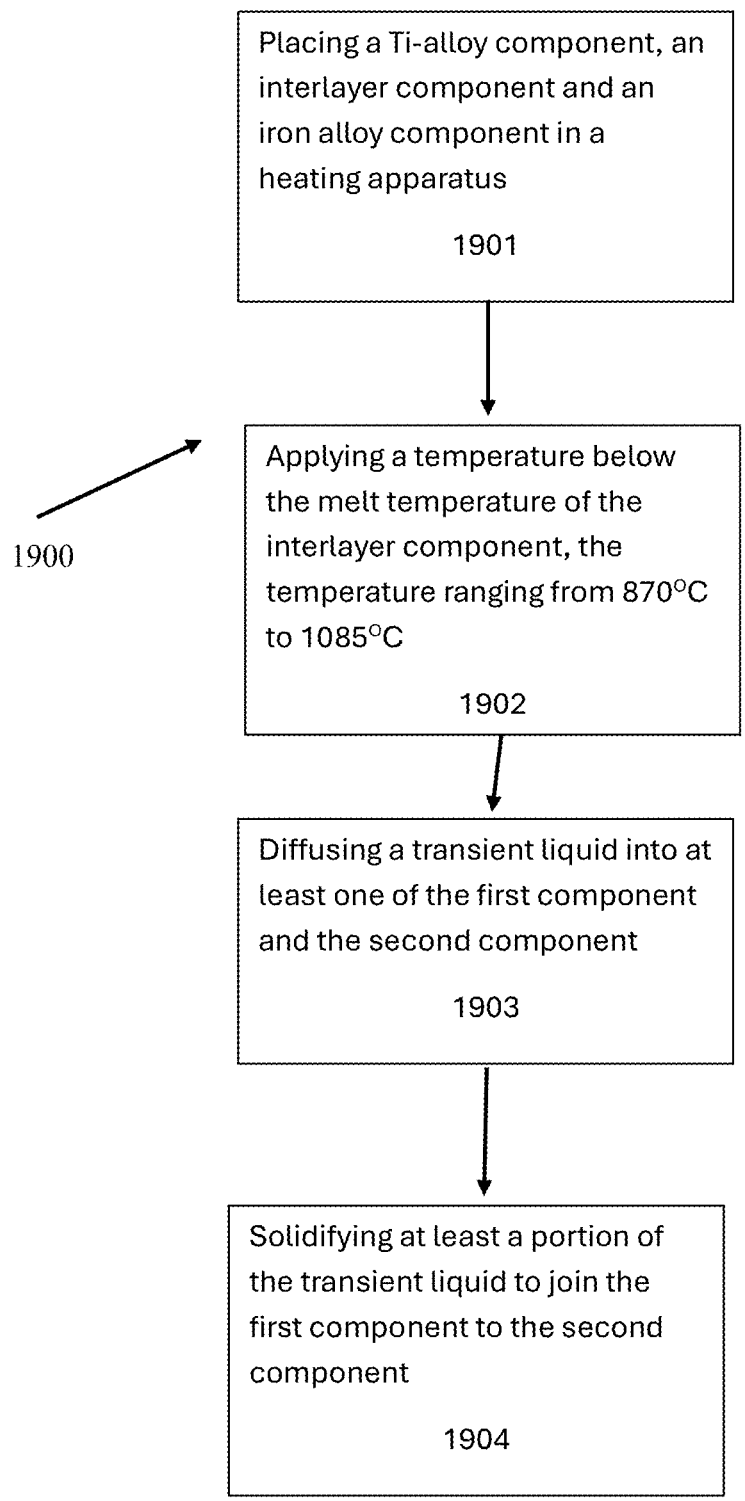
FIG. 19 is a flow chart for a method for joining golf club components.

A method 1900 for joining golf club head components is shown in FIG. 19. At block 1901, a first component composed of a titanium alloy, a second component composed of an iron alloy, and an interlayer component at a joint between the first component and the second component are all placed in a heating apparatus. The interlayer component is preferably composed of a copper material. At block 1902, a temperature below the melt temperature of the interlayer component is applied to form a transient liquid at the joint during a transient liquid phase. The temperature of the transient liquid phase ranges from 870° C. to 1085° C. At block 1903, the transient liquid diffuses into at least one of the first component or the second component. At block 1904, at least a portion of the transient liquid is solidified to join the first component to the second component.

Figure 20:
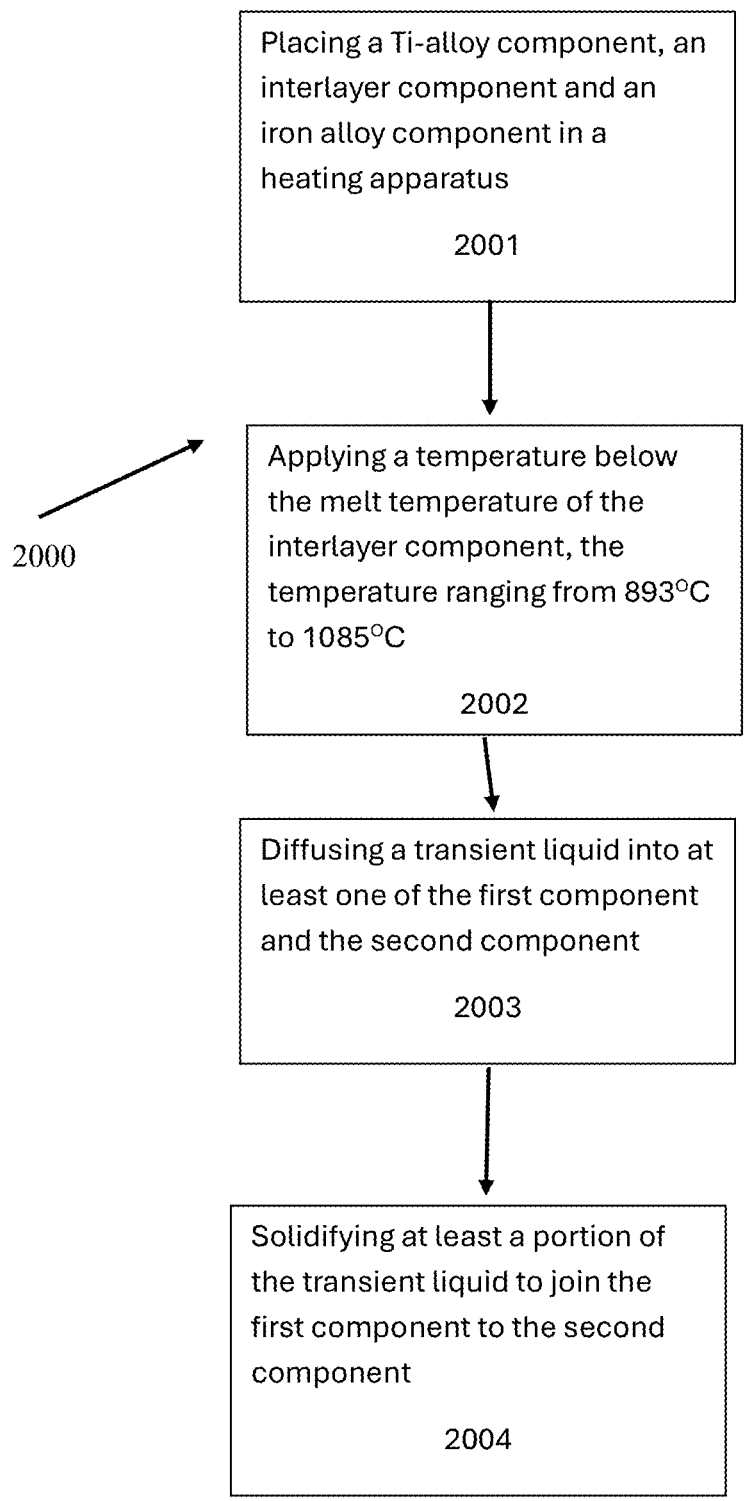
FIG. 20 is a flow chart for a method for joining golf club components.

A method 2000 for joining golf club head components is shown in FIG. 20. At block 2001, a first component composed of a titanium alloy, a second component composed of an iron alloy, and an interlayer component at a joint between the first component and the second component are all placed in a heating apparatus. The interlayer component is composed of a first layer composed of a zirconium material and a second layer composed of a copper material. At block 2002, a temperature below the melt temperature of the interlayer component is applied to form a transient liquid at the joint during a transient liquid phase. The temperature of the transient liquid phase ranges from 893° C. to 1085° C. At block 2003, the transient liquid diffuses into at least one of the first component or the second component. At block 2004, at least a portion of the transient liquid is solidified to join the first component to the second component.

Figure 21:
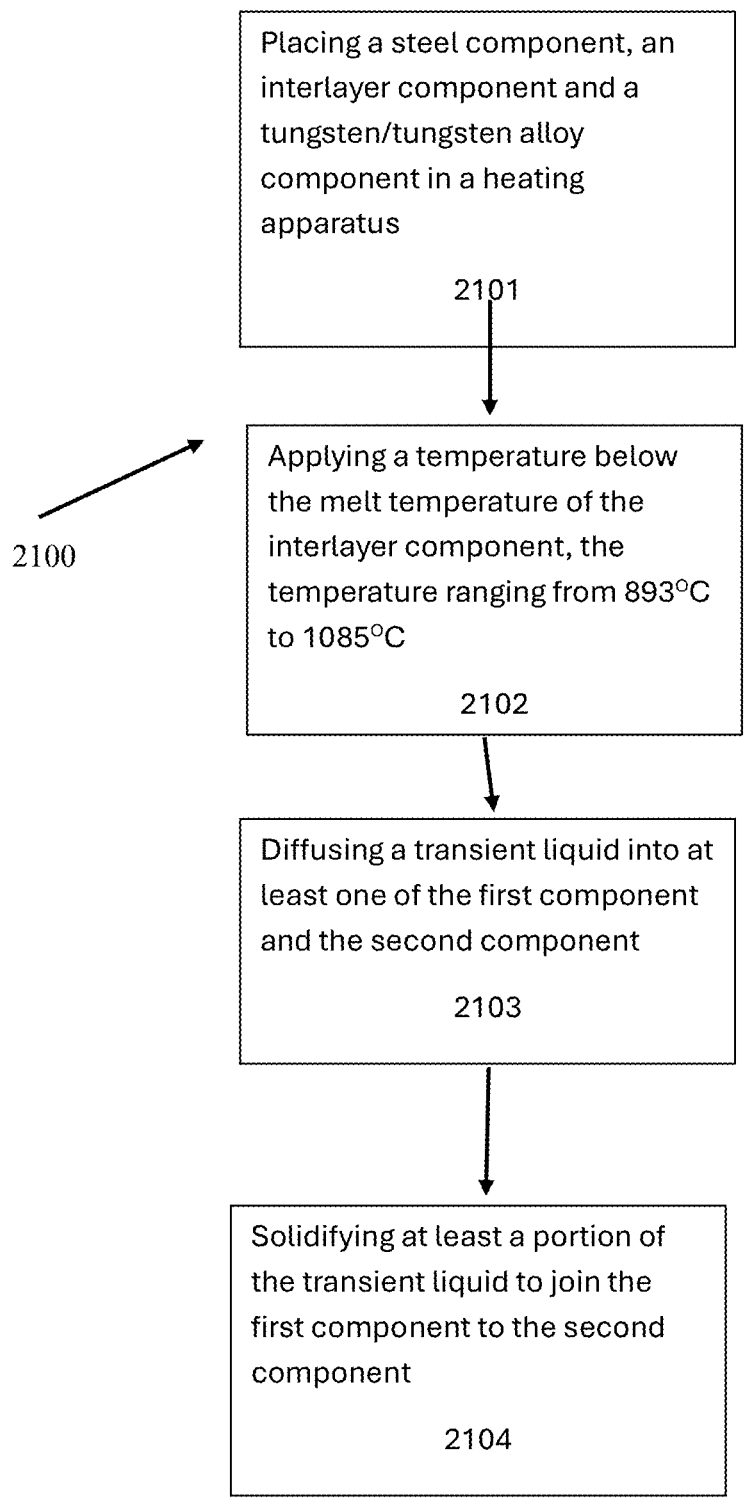
FIG. 21 is a flow chart for a method for joining golf club components.

A method 2100 for joining golf club head components is shown in FIG. 21. At block 2101, a first component composed of a steel, a second component composed of tungsten or a tungsten alloy, and an interlayer component at a joint between the first component and the second component are all placed in a heating apparatus. The interlayer component is composed of a first layer composed of a zirconium material and a second layer composed of a copper material. At block 2102, a temperature below the melt temperature of the interlayer component is applied to form a transient liquid at the joint during a transient liquid phase. The temperature of the transient liquid phase ranges from 893° C. to 1085° C. At block 2103, the transient liquid diffuses into at least one of the first component or the second component. At block 2104, at least a portion of the transient liquid is solidified to join the first component to the second component.

Aplin et al., U.S. Pat. No. 10,946,255 for Methods Of Manufacturing Golf Club Heads, is hereby incorporated by reference in its entirety.

Seluga et al., U.S. Pat. No. 10,569,146 for a Golf Club Head With Face Dampening And Stress-Reduction Features, is hereby incorporated by reference in its entirety.

Westrum et al., U.S. Pat. No. 11,090,534 for a Golf Club Head Comprising Microscopic Bubble Material, is hereby incorporated by reference in its entirety.

Seluga et al., U.S. Pat. No. 10,213,661 for a Golf Club Head With Tubes Connecting Crown To Elongated Protrusion, is hereby incorporated by reference in its entirety.

Myers et al., U.S. Pat. No. 9,987,527 for an Iron-Type Golf Club Head With Stiffening Rods, is hereby incorporated by reference in its entirety.

Seluga et al., U.S. Pat. No. 10,010,771 for an Iron-Type Golf Club Head With Elevated Weight Bar And Stress-Relieving Structures, is hereby incorporated by reference in its entirety.

Seluga et al., U.S. Pat. No. 10,039,965 for an Iron-Type Golf Club Head With Dampening Features, is hereby incorporated by reference in its entirety.

Ivanova et al., U.S. Pat. No. 9,861,863 for an Iron-Type Golf Club Head With Lightweight Hosel, is hereby incorporated by reference in its entirety.

Westrum, U.S. Pat. No. 9,675,852 for an Iron-Type Golf Club Head, is hereby incorporated by reference in its entirety.

Kim et al., U.S. Pat. No. 9,227,117 for an Adjustable Iron-Type Golf Club Head, is hereby incorporated by reference in its entirety.

Dawson et al., U.S. Pat. No. 9,233,281 for an Iron-Type Golf Club Head, is hereby incorporated by reference in its entirety.

Ivanova et al., U.S. Pat. No. 9,345,937 for an Iron-Type Golf Club Head, is hereby incorporated by reference in its entirety.

Griffin et al., U.S. Pat. No. 9,381,409 for a Multiple Material Iron, is hereby incorporated by reference in its entirety.

Kuhar et al., U.S. Pat. No. 9,381,408 for an Iron-Type Golf Club Head, is hereby incorporated by reference in its entirety.

Dawson et al., U.S. Pat. No. 8,821,313 for an Iron-Type Golf Club Head, is hereby incorporated by reference in its entirety.

Ivanova et al., U.S. Pat. No. 8,911,302 for an Iron-Type Golf Club Head, is hereby incorporated by reference in its entirety.

Itokazu et al., U.S. patent application Ser. No. 18/232,979, filed on Aug. 11, 2023, for a Golf Club Head With Miter Joint For Brazing, is hereby incorporated by reference in its entirety.

Itokazu et al., U.S. patent application Ser. No. 18/232,979, filed on Aug. 11, 2023, for a Golf Club Head With Miter Joint For Brazing, is hereby incorporated by reference in its entirety.

Itokazu et al., U.S. patent application Ser. No. 18/732,424, filed on Jun. 3, 2024, for a Golf Club Head With Miter Joint For Brazing, is hereby incorporated by reference in its entirety.

Power, U.S. patent application Ser. No. 18/240,994, filed on Aug. 31, 2023, for a Method of Co-Brazing Golf Club Components, is hereby incorporated by reference in its entirety.

Power, U.S. patent application Ser. No. 18/238,304, filed on Aug. 25, 2023, for a Method of Brazing Golf Club Components, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for joining golf club head components comprising:

placing in a heating apparatus a golf club head face component composed of a titanium alloy, a golf club head body component composed of an iron alloy, and an interlayer component in a joint between the golf club head face component and the golf club head body component, the interlayer component comprising a first layer directly contacting the golf club head face component and composed of a zirconium material and a second layer directly contacting the golf club head body component and composed of a copper material;

applying a temperature below a melt temperature of the interlayer component to form a transient liquid at the joint during a transient liquid phase, wherein the temperature of the transient liquid phase ranges from 893° C. to 1085° C.;

diffusing the transient liquid into at least one of the golf club head face component or the golf club head body component; and solidifying at least a portion of the transient liquid to join the golf club head face component to the golf club head body component.

2. The method according to claim 1 wherein the golf club head face component is a wood-type golf club face component and the golf club head body component is a wood-type golf club body component.

3. The method according to claim 1 wherein the golf club head face component is an iron-type golf club face component and the golf club head body component is an iron-type golf club body component.

4. The method according to claim 1 further comprising applying a vacuum with a maximum vacuum level ranging from $10^{-2}$ Torr to $10^{-7}$ Torr.

5. A method for joining golf club head components comprising:

placing in a heating apparatus a golf club head body component composed of a steel, a weight component composed of tungsten or a tungsten alloy, and an interlayer component in a joint between the golf club head body component and the weight component, the interlayer component comprising a first layer directly contacting the golf club head body component and composed of a zirconium material and a second layer directly contacting the weight component and composed of a copper material;

applying a temperature below a melt temperature of the interlayer component to form a transient liquid at the joint during a transient liquid phase, wherein the temperature of the transient liquid phase ranges from 893° C. to 1085° C.;

diffusing the transient liquid into at least one of the golf club head body component or the weight component; and solidifying at least a portion of the transient liquid to join the golf club head body component to the weight component.

6. The method according to claim 5 wherein the golf club head body component is a wood-type golf club body component.

7. The method according to claim 5 wherein the golf club head body component is an iron-type golf club body component.

8. The method according to claim 5 further comprising applying a vacuum with a maximum vacuum level ranging from $10^{-2}$ Torr to $10^{-7}$ Torr.

* * * * *